United States Patent [19]
Nordberg et al.

[11] Patent Number: 5,607,078
[45] Date of Patent: Mar. 4, 1997

[54] DEVICE FOR COUNTING AND MEASURING LIQUID CONSUMPTION

[76] Inventors: Brian E. Nordberg; Maria D. Nordberg, both of 11221 S. 51st St., Apartment 1013, Phoenix, Ariz. 85044

[21] Appl. No.: 505,106

[22] Filed: Jul. 21, 1995

[51] Int. Cl.⁶ ........................................................ G09F 9/37
[52] U.S. Cl. ...................... 220/756; 220/710.5; 116/227; 116/321; 116/324
[58] Field of Search ....................... 73/426, 427; 116/227, 116/281, 307, 321, 323, 324; 206/459.1, 534; 220/703, 710.5, 771, 756

[56] References Cited

U.S. PATENT DOCUMENTS

| | | |
|---|---|---|
| 200,274 | 2/1878 | Frey . |
| 617,952 | 1/1899 | Burton . |
| 648,063 | 4/1900 | Bauman . |
| 710,708 | 10/1902 | McShane . |
| 1,636,752 | 7/1927 | Mitchell ................................. 116/323 |
| 1,772,297 | 8/1930 | Venable .................................. 73/426 |
| 2,593,868 | 4/1952 | Fowler ..................................... 65/61 |
| 3,258,161 | 6/1966 | Wolven .................................. 73/427 |
| 4,208,984 | 6/1980 | Glanzman ............................. 116/324 |
| 4,877,119 | 10/1989 | Hosking ................................. 206/459 |
| 4,878,588 | 11/1989 | Ephraim ............................... 215/11.2 |
| 4,928,514 | 5/1990 | Beaston ................................. 73/427 |
| 4,951,596 | 8/1990 | Wallace, Jr. .......................... 116/321 |
| 4,997,013 | 3/1991 | Peckels ................................ 116/227 |

*Primary Examiner*—Stephen J. Castellano
*Attorney, Agent, or Firm*—Molly D. McKay, P. C.

[57] ABSTRACT

A graduated drinking mug having a handle with a movable clip for keeping track of the number and total volume of refills. The clip has a window through which numerals of a first scale are visible. The numerals of the first scale range from 0 through 10 and represent the number of refills of the mug. The clip is provided with pointers which point to scales showing the total volume of liquid corresponding to the number of refills for 8 ounce refills and 10 ounce refills.

8 Claims, 3 Drawing Sheets

DEVICE FOR COUNTING AND MEASURING LIQUID CONSUMPTION

BACKGROUND OF THE INVENTION

1. Field of the Invention

The present invention relates to a drinking container for measuring different volumes of a liquid contained therein and for counting the number of refills of the liquid consumed by a person in order to keep track of the person's daily fluid intake.

2. Description of the Related Art

The human body is composed primarily of water. To maintain the body and to insure its proper functioning, health professionals recommend that a person consume approximately eight 8 ounce glasses of water daily, i.e., approximately 64 ounces of water daily. Proper water consumption is particularly emphasized for individuals who are attempting to reduce their body weight by dieting.

Keeping track of the amount of water consumed in a day requires some type of recording procedure, since it is easy for a person to forget how many glasses of water have been consumed during any given day. However, the recording procedure should be simple to use and the recording means needs to be incorporated into a drinking container so that the volume can be recorded by the user simultaneously with each refill of the drinking container. Also, the recording means needs to be incorporated into the container in such a way that the container is sanitary and can be easily cleaned, either by hand washing or by means of an automatic dishwasher.

Finally, the recording means should be able to keep a running tally even when the container is refilled to different volumes, for example, an 8 ounce glassful of water or a 10 ounce glassful of water.

The present invention addresses these needs by providing a graduated mug having a handle thereon. The handle is provided vertically with a plurality of incremental scales. The first of the scales is provided on an outwardly facing vertical surface of the handle and additional scales, are provided on vertical side surfaces of the handle adjacent the outwardly facing vertical surface. The first scale ranges from 0 to 10 in increments of 1, to indicate the number of refills. The remaining scales each indicate ounces of liquid volume corresponding to the different refill numbers on the first scale. For example, the second scale might have 8 ounce increments and another scale might have 10 ounce increments. The handle is provide with a movable clip having a window therein for viewing the first scale and one or more pointers thereon for pointing to total volume on the second or other scales corresponding to the number of refills appearing in the window of the clip. The handle is provided with notches engagable by ears provided on the clip in order to hold the clip at a given vertical position on the handle until its position is changed by the user.

SUMMARY OF THE INVENTION

The present invention is a device in the shape of a drinking mug having a concave container portion for receiving liquid and a handle attached externally to the container portion. Fill lines are provided on the container portion, preferably at 8 ounce and 10 ounce volumes of the container portion.

The handle is provided with an outwardly facing vertical surface and left and right vertical side surfaces each adjacent to and approximately perpendicular to the outwardly facing vertical surface. The outwardly facing vertical surface is provided with a first scale comprised of whole numerals 0 through 10. A second scale is provided on the left vertical side surface and is comprised of 8 ounce increments of total volume between the volumes of 0 and 80 ounces. The right vertical side surface is provided with a third scale which is comprised of 10 ounce increments of total volume between the volumes of 0 and 100 ounces.

A clip is movably provided on the handle. The clip is provided with ears which removably engage notches provided on the handle in order to hold the clip stationary relative to the handle. The notches are spaced apart in such a way that a window provided in the clip aligns with a numeral on the first scale so that the numeral is visible through the window each time the ears engage the notches. To use the device, each morning the user moves the clip so the window aligns with the first numeral, i.e., "0", and each time the container portion is refilled, the clip is moved upward to the next notches so the next consecutive numeral appears in the window.

The clip is provided with a left pointer and a right pointer which extend inward toward the container portion approximately parallel to and adjacent the left and right vertical side surfaces, respectively. The second and third scales are aligned with the first scale so that the left and right pointers point toward 8 ounce and 10 ounce increments provided on the second and third scales, respectively corresponding to the total Volume of liquid consumed for any given number of refills as indicated by the numeral within the clip's window. The total liquid volume consumed is read on the second scale if the container portion is being refilled to the 8 ounce fill line or, alternately, read on the third scale if the container portion is being refilled to the 10 ounce fill line.

DETAILED DESCRIPTION OF THE PREFERRED EMBODIMENT

Figure 1:
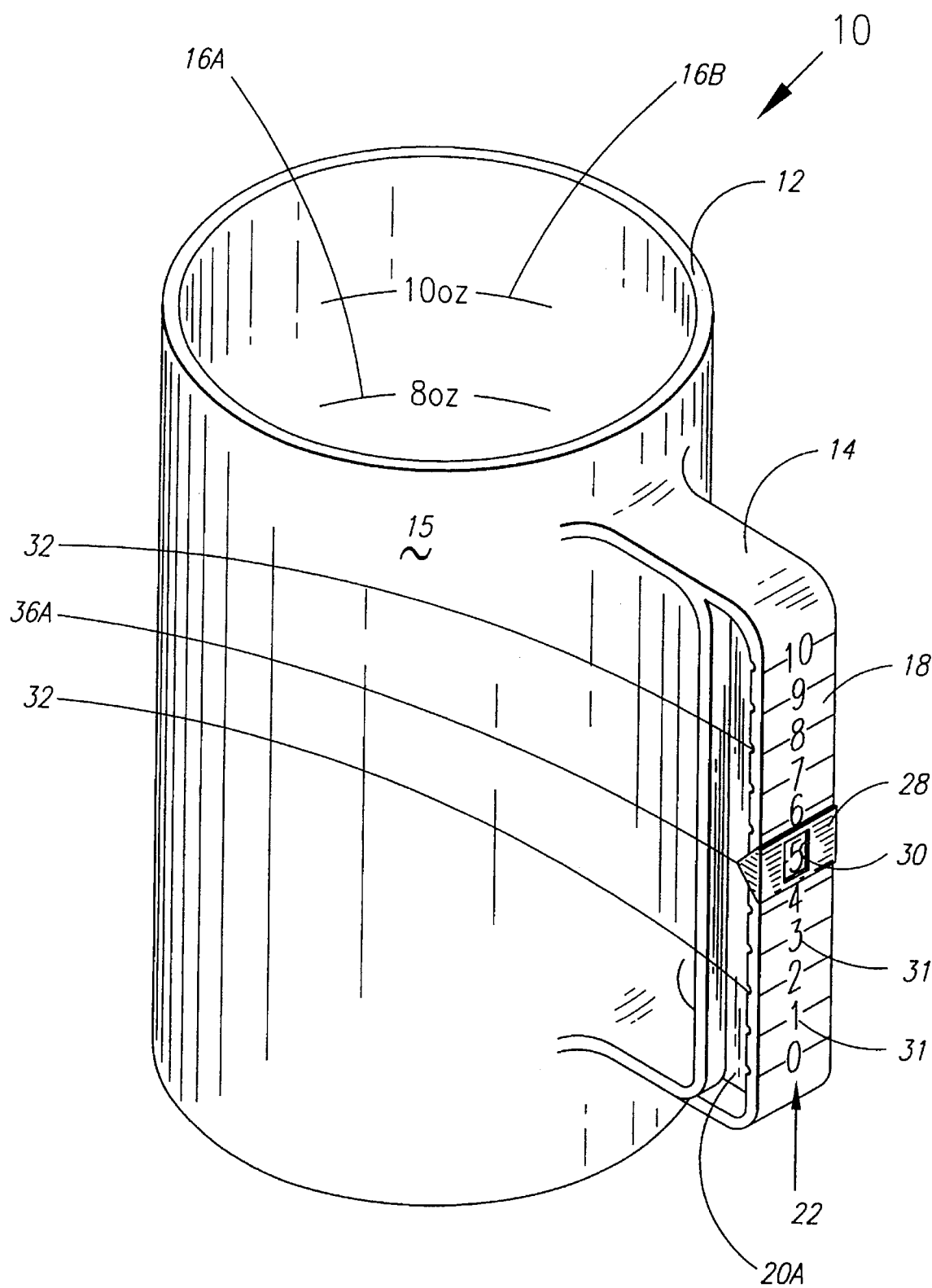
FIG. 1 is a perspective view of a device for counting and measuring liquid consumption constructed in accordance with a preferred embodiment of the present invention.
Figure 2:
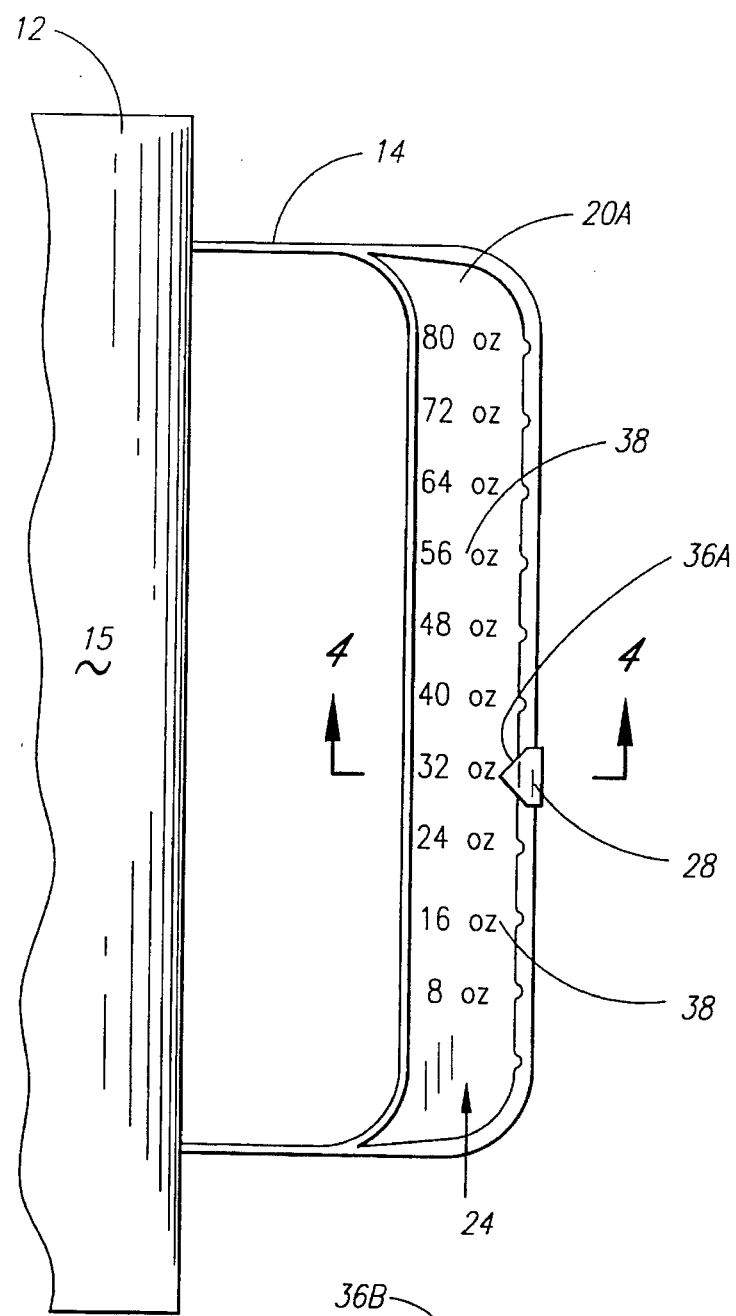
FIG. 2 is a left side elevation showing the handle of the device of FIG. 1.
Figure 4:
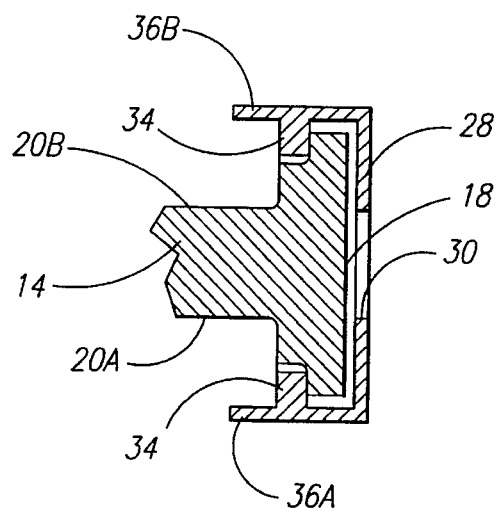
FIG. 4 is a cross-sectional view taken along line 4—4 of FIG. 2.
Figure 3:
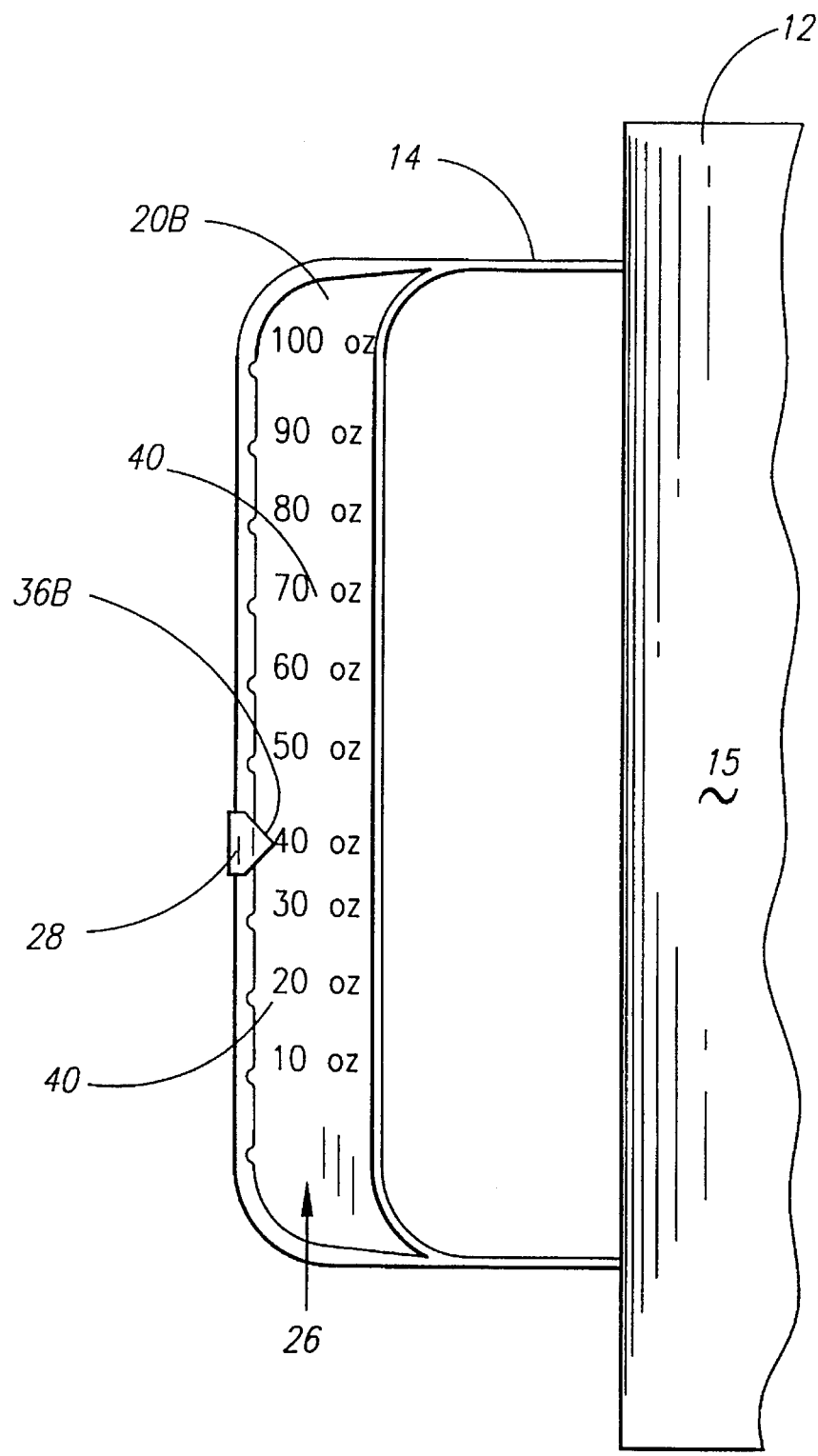
FIG. 3 is a right side elevation showing the handle of the device of FIG. 1.

Referring now to the drawings and initially to FIG. 1, there is illustrated a device 10 constructed according to a preferred embodiment of the present invention. The device 10 is in the shape of a mug, having a concave container portion 12 for receiving fluid, such as water, and having a vertical handle 14 attached to an external surface 15 of the container portion 12.

The container portion 12 is provided thereon with fill lines 16A and 16B corresponding to certain liquid volumes, preferably 8 ounce and 10 ounce volumes respectively.

The handle 14 is provided with an outwardly facing vertical surface 18 and left and right vertical side surfaces 20A and 20B so that each vertical side surface 20A and 20B is adjacent to and approximately perpendicular to the outwardly facing vertical surface 18.

The outwardly facing vertical surface 18 is provided with a first scale 22 comprised of consecutively ordered whole numerals 31 beginning with 0 and ending with 10. The first scale 22 represents the number of times the container portion 12 is refilled with liquid to either the 8 ounce fill line 16A or the 10 ounce fill line 16B. It is important that the container portion 12 be refilled to the same fill line, either 16A or 16B, consistently during a given day.

Each of the vertical side surfaces 20A and 20B is provided with its own scale 24 and 26. The second scale 24 is a linear fluid volume scale, preferably graduated in 8 ounce increments 38, and the third scale 26 is also a linear fluid volume scale, preferable graduated in 10 ounce increments 40. The second and third scales 24 and 26 correspond with the first scale 22 as will be more fully explained hereafter with regard to a clip 28 movable provided on the handle 14.

The clip 28 is movably attached to the handle 14 so that the clip 28 can be moved upward and downward by the user relative to the handle 14. The clip 28 is provided with a window 30 therein through which individual, numerals 31 of the first scale 22 can be viewed, as illustrated in FIG. 1. The handle 14 is provided with notches 32 corresponding with each numeral 31. The clip 28 is provided with inwardly extending ears 34 which are removably engagable with the notches 32 in order to hold the clip 28 to the handle 14 so that the individual numerals 31 align with the window 30 and can be viewed therethrough.

The clip 28 is also provided on opposite sides with left and right pointers 36A and 36B which extend toward the container portion 12 and are approximately parallel to their corresponding vertical side surfaces 20A and 20B. The second and third scales 24 and 26 are aligned with the first scale 22 so that the 8 ounce increments 38 provided on the second scale 24 and the 10 ounce increments 40 provided on the third scale 26 are aligned with the numerals 31 corresponding to the number of 8 and 10 ounce refills, respectively, needed to achieve the total volume of liquid shown on scales 24 and 26. Thus, when the window 30 is aligned with the second numeral 31, i.e., "1" on the first scale 22, the left pointer 36A points to the 8 ounce increment 38 corresponding to 8 ounces of total volume and the right pointer 36B points to the 10 ounce increment 40 corresponding to 10 ounces of total volume. Likewise, when the window 30 is aligned with the third numeral 31, i.e., "2", the left pointer 36A points to the 8 ounce increment 38 corresponding to 16 ounces of total volume and the right pointer 36B points to the 10 ounce increment 40 corresponding to 20 ounces of total volume.

To use the device 10, at the beginning of the day, the user moves the clip 28 downward so that the first numeral 31, i.e., "0", appears in the window 30. Then each time during the day when the container portion 12 is refilled with liquid to one of the fill lines, either 16A or 16B, the clip 28 is moved upward so that the next larger numeral 31 appears in the window 30. The user must refill the container portion 12 to the same fill line, either 16A or 16B, each time during the day. At the end of the day or at any time during the day, the user can determine the total volume of liquid consumed by observing the appropriate pointer, either 36A or 36B. If the container portion 12 has been refilled to the 8 ounce fill line 16A, then the left pointer 20A is the one to be observed, and if the container portion 12 has been refilled to the 10 ounce fill line 16B, then the right pointer 20B is the one to be observed. The pointer, either 20A or 20B, will point to the increment, either 8 ounce increment 38 or 10 ounce increment 40, corresponding to the total volume of fluid consumed.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A drinking mug comprising:

a container portion having at least one fill line, a handle being attached to said container portion, a scale of refill indicating numerals being provided on said handle, a first scale of volume indicating increments being provided on said handle so that each refill indicating numeral on the scale of refill indicating numerals is associated with a volume indicating increment on the first scale of volume indicating increments, each volume indicating increment on the first scale being numerically equal to a volume of liquid needed to refill the container portion to a first at least one fill line a number of times equal to its associated refill indicating numeral, a clip movably provided on said handle, said clip being provided with a means for indicating a given refill indicating numeral on said scale of refill indicating numerals and a first means for indicating a given volume indicating increment on the first scale of volume indicating increments.

2. A mug according to claim 1 wherein said means for indicating a given numeral and said first means for indicating a given volume indicating increment further comprise:

said clip being provided with a window through which said refill indicating numerals are visible, and said clip being provided with a pointer for pointing to a volume indicating increment on the first scale of volume indicating increments.

3. A mug according to claim 1 further comprising:

said handle being provided with notches corresponding to each said refill indicating numeral, and said clip being provided with ears removably engagable with said notches.

4. A mug according to claim 1 wherein said scale of refill indicating numerals includes refill indicating numerals 0 through 10.

5. A mug according to claim 4 wherein said first scale of volume indicating numerals is divided into increments of 8 ounces and said first scale of volume indicating numerals includes volume increments 8 through 80 ounces.

6. A mug according to claim 5 further comprising a second scale of volume indicating increments being provided on said handle so that each refill indicating numeral is associated with a volume indicating increment on the second scale, and each volume indicating increment on the second scale is numerically equal to a volume of liquid needed to refill the container portion to a second at least one fill line a number of times equal to its associated refill indicating numeral, said second scale being divided into increments of 10 ounces, and said second scale including volume increments 10 through 100 ounces.

7. A mug according to claim 1 further comprising:

said clip being provided with a second means for indicating a volume increment on said second scale of incremental volumes.

8. A mug according to claim 7 wherein said second means for indicating a volume increment comprises:

a second pointer being provided on said clip for pointing to a volume indicating increment on the second scale.

* * * * *